United States Patent [19]
Fujita et al.

[11] Patent Number: 6,093,977
[45] Date of Patent: Jul. 25, 2000

[54] VEHICLE ELECTRONIC EQUIPMENT APPARATUS AND ITS ASSEMBLING METHOD

[75] Inventors: Nagahisa Fujita; Futoshi Shouji, both of Hiroshima; Yoshinori Otsubo, Higashihiroshima; Hiroshi Ohmura, Hatsukaichi, all of Japan

[73] Assignee: Mazda Motor Corporation, Hiroshima-ken, Japan

[21] Appl. No.: 09/242,260

[22] PCT Filed: Jun. 11, 1996

[86] PCT No.: PCT/JP98/02580

§ 371 Date: Feb. 12, 1999

§ 102(e) Date: Feb. 12, 1999

[87] PCT Pub. No.: WO98/57825

PCT Pub. Date: Dec. 23, 1998

[30] Foreign Application Priority Data

Jun. 17, 1997 [JP] Japan .................................. 9-160086

[51] Int. Cl.⁷ ........................................................ B60L 1/00
[52] U.S. Cl. ............................................................ 307/10.1
[58] Field of Search ........................... 307/10.1; 455/347, 455/349; 381/86; 369/12

[56] References Cited

U.S. PATENT DOCUMENTS

| | | | |
|---|---|---|---|
| 5,175,926 | 1/1993 | Chapman | 381/86 |
| 5,339,362 | 8/1994 | Harris | |
| 5,397,160 | 3/1995 | Landry | |
| 5,889,337 | 3/1999 | Ito et al. | 307/10.1 |
| 6,032,089 | 2/2000 | Buckley | 307/10.1 |

FOREIGN PATENT DOCUMENTS

| | | |
|---|---|---|
| 0 178 010 | 4/1986 | European Pat. Off. . |
| 2 747 347 | 10/1997 | France . |
| 32 48 719 | 7/1983 | Germany . |

*Primary Examiner*—Stephen W. Jackson
*Assistant Examiner*—Rios Roberto

[57] ABSTRACT

A central control panel (P) and accessory control components (U2, U3) are selected in correspondence with the type of vehicle, and are electrically and mechanically integrally connected to each other together with a signal control component (U1). The control components (U1–U3) are stored in an opening portion (2) of an instrument panel (1), and the opening portion is covered by the central control panel (P). Upon operation of a given switch (7) on the central control panel (P), a switch signal is output to the signal control component (U1), which outputs an activation signal representing the activation condition corresponding to the switch signal to the accessory control components (U2, U3), and the accessory control components (U2, U3) output display control signals according to the activation signal to the central control panel (P).

14 Claims, 6 Drawing Sheets ated in the middle of an instrument panel between the driver seat and front passenger seat. More specifically, air-conditioner and audio control vehicle electric device components are disposed in this portion, and a console including switches and the like operated by a passenger, and a display unit such as a display for displaying the operation states of the vehicle electric device components are mounted on its front surface, i.e., the surface facing the passenger room. Recently, the variety of audio units (car accessories) has increased, and the number of audio units including an AM/FM radio receiver, cassette deck, CD player, MD player, equalizer, and the like alone is considerable. In addition to these units, a navigation unit is also popularly mounted, and a display for displaying the map for the navigation unit is required.

Conventionally, vehicle electric device components having different functions (contents of information processing) are independent of each other, and have consoles operated by the passenger and display units for the passenger on their front surfaces, i.e., the surfaces facing the passenger room in units of independent vehicle electric device components. In order to concentrate or commonly use the display units and a large number of consoles as much as possible, a plurality of vehicle electric device components having different functions are sometimes configured into a single unit.

Japanese Patent Laid-Open No. 61-244636 proposed a frame that configures a plurality of independent vehicle electric device components having different functions into one set. More specifically, this reference proposed method of configuring a plurality of vehicle electric device components into one set using a frame which comprises a chassis portion for coupling a plurality of vertically stacked vehicle electric device components into a single set, and a front surface panel portion that forms a wall surface facing the passenger room. However, the individual vehicle electric device components independently have display units and consoles, and the front surface panel portion is formed with only openings that allow observation of these display units from the passenger room, and openings that allow operation of the consoles from the passenger room. That is, the frame merely serves as a fastening component for configuring a plurality of independent vehicle electric device components into one set.

As described above, when many vehicle electric device components are concentrated on a narrow space, the layout of the display units and many consoles is considerably limited, and it is not preferable in terms of operability and visibility. As the number of vehicle electric device components becomes larger, the operability and visibility for some vehicle electric device components worsen.

As a method of improving operability and visibility, as described above, different functions are combined to build a single unit. However, in this case, since the number and variety of vehicle electric device components to be mounted (the number and variety of functions) vary depending on grades even in an identical model of vehicle, a considerable number of combinations exist for the number and variety of vehicle electric device components to be mounted. For this reason, when sets of units are prepared in correspondence with these many combinations, the number (variety) of sets becomes considerable. This fact limits formation of such sets, and the number of sets manufactured per kind becomes small, resulting in high cost.

Especially, in recent vehicles, a console for an air conditioner is arranged in the middle portion of an instrument panel in the widthwise direction of the vehicle in advance from the vehicle design process, and a 2-DIN opening is formed in a portion except for the console for the air conditioner. Units of the audio system, navigation apparatus, and the like must be arranged within this 2-DIN space, thus tremendously limiting the layout of the consoles and display units of the vehicle electric device components.

The present invention has been made in consideration of the above problems, and has as its first object to provide a vehicle electronic equipment apparatus with high operability and visibility and its assembling method.

It is the second object of the present invention to provide a vehicle electronic equipment apparatus which can also improve the appearance in the passenger room, and its assembling method.

It is the third object of the present invention to provide a vehicle electronic equipment apparatus which can easily combine a plurality of vehicle electric device components having different functions, and can reduce cost, and its assembling method.

DISCLOSURE OF THE INVENTION

In order to solve the above-mentioned problems and to achieve the objects, a vehicle electronic equipment apparatus according to the present invention comprises the following arrangement. That is, The apparatus comprises vehicle electronic equipment apparatus comprises at least one first control unit which is independently arranged, and executes different control processing operations, a central control panel which has a console and display unit for the first control unit, and defines a portion of an inner surface of a passenger room, and a second control unit which is arranged independently of the first control unit and the central control panel, is electrically connected to the central control panel, and executes signal processing with the first control unit via the central control panel, and in a state wherein the first and second control units are electrically connected to the central control panel, an operation signal according to an operation of the console can be output from the central control panel to the second control unit, a control signal according to an operation of the console can be output from the second control unit to the first control unit via the central control panel, an activation signal representing an activation condition according to the control signal can be output from the first control unit to the second control unit via the central control panel, and the second control unit can output a display control signal according to the activation signal to the central control panel.

Preferably, the central control panel has a first connection portion to which the first control unit is electrically connected, and a second connection portion to which the second control unit is electrically connected.

Preferably, the first and second control units are connected to the central control panel in a subassembly state, and the first and second control units and the central control panel are integrated.

Preferably, a plurality of the first control units and the second control unit are mounted, and the second control unit executes a signal communication with the first control unit via communication line provided to the central control panel.

Preferably, the display unit is a display for displaying image information, the first control unit includes a control unit for a navigation apparatus, and image information of the control unit for the navigation apparatus is output to the central control panel without intervention of the second control unit.

Preferably, the inner surface of the passenger room comprises an instrument panel, which is formed with an opening portion for receiving the first and second control units, and the opening portion is covered by the central control panel while the first and second control units are stored in the instrument panel from the opening portion.

In order to solve the above-mentioned problems and to achieve the objects, an assembling method for a vehicle electronic equipment apparatus according to the present invention has the following features. That is, The method comprises the first step of selecting at least one of at least a plurality of first control units, which are independent from each other, and execute different control processing operations, in correspondence with a type of vehicle, the second step of selecting one of central control panels, each of which has a console and display unit for the first control unit, and defines a portion of an inner surface of a passenger room, in correspondence with the type of vehicle, and the third step of electrically connecting a second control unit, which is arranged independently of the first control unit and the central control panel, and executes signal processing with the first control unit via the central control panel, and the first control unit selected in the second step to the central control panel selected in the first step, and the first and second control units are electrically connected to the central control panel, so as to allow the central control panel to output an operation signal according to an operation at the console to the second control unit, the second control unit to output a control signal according to an operation at the console to the first control unit via the central control panel, the first control unit to output an activation signal representing an activation condition corresponding to the control signal to the second control unit via the central control panel, and the second control unit to output a display control signal according to the activation signal to the central control panel.

Preferably, the method further comprises the fourth step of integrating the first and second control units, and the central control panel by connecting the first and second control units to a rear surface of the central control panel in a subassembly state, and the first and second control units, and the central control panel are assembled in a vehicle in the integrated state obtained in the fourth step.

Preferably, the inner surface of the passenger room comprises an instrument panel, which is formed with an opening portion for receiving the first and second control units, and the opening portion is covered by the central control panel while the first and second control units are stored in the instrument panel from the opening portion.

BEST MODE FOR CARRYING OUT THE INVENTION

An embodiment according to the present invention will be described in detail hereinafter with reference to the accompanying drawings.

Note that an electronic equipment apparatus of this embodiment is connected to a navigation apparatus, audio equipment, and the like, and constitutes a central control means that can concentratively control these apparatuses via a display and control panel. Hence, in the following description, the electronic equipment apparatus will be referred to as a central control panel.

The central control panel is connected to vehicle electric device components (car accessories) such as an audio equipment, navigation apparatus, and the like in place of their normal operation switches, and the like, and can concentratively control these components.

According to this central control panel, vehicle electric device components which are conventionally individually attached can be integrally arranged, and central control panels having different designs and functions are prepared in correspondence with the types of vehicles, thus broadening the range of choice by the user and allowing the user to consider the appearance of the passenger room upon choosing the central control panel.

Figure 1:
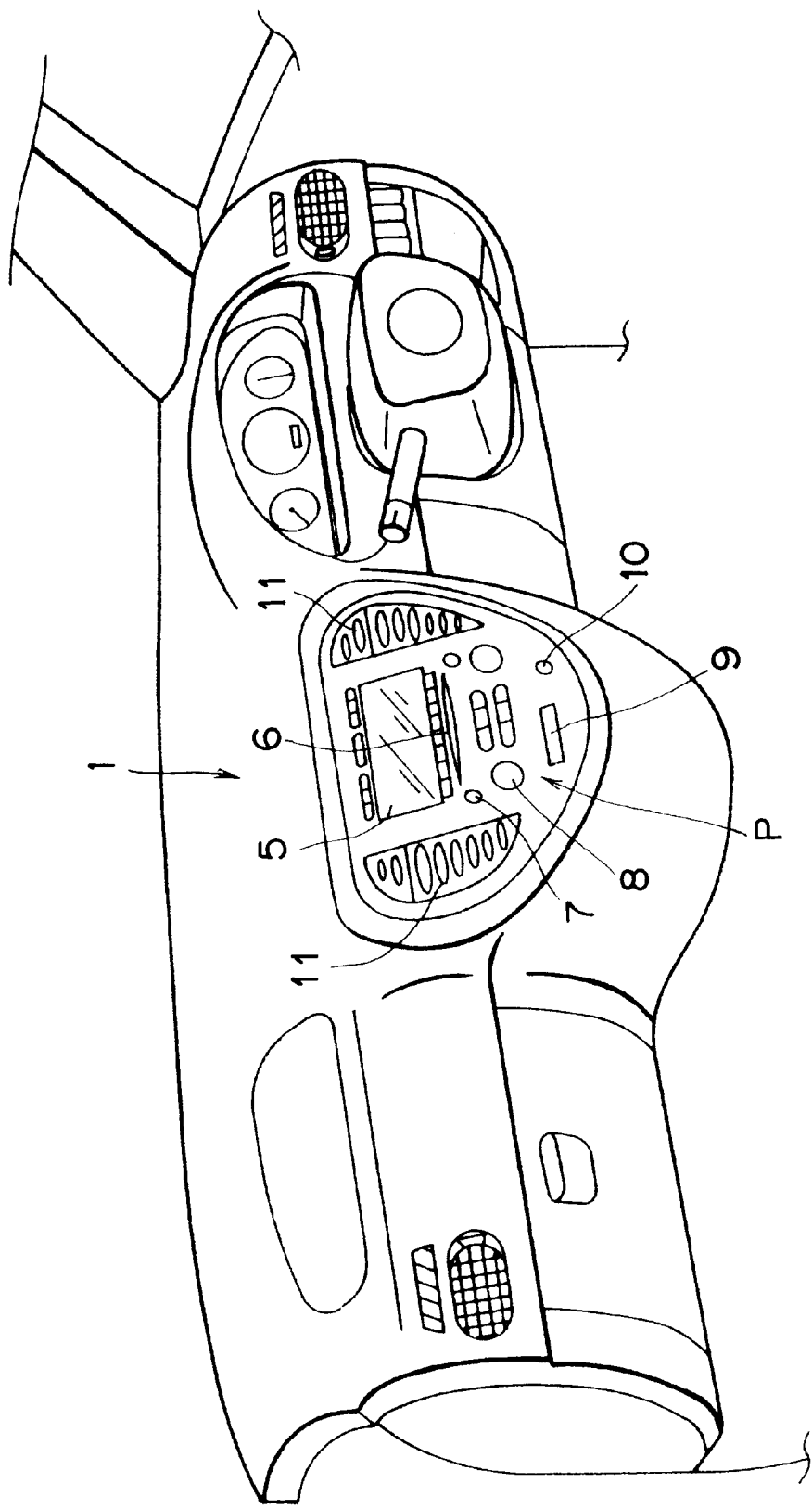
FIG. 1 is a perspective view showing an example in which a vehicle electronic equipment apparatus according to an embodiment of the present invention is mounted in an instrument panel.
Figure 2:
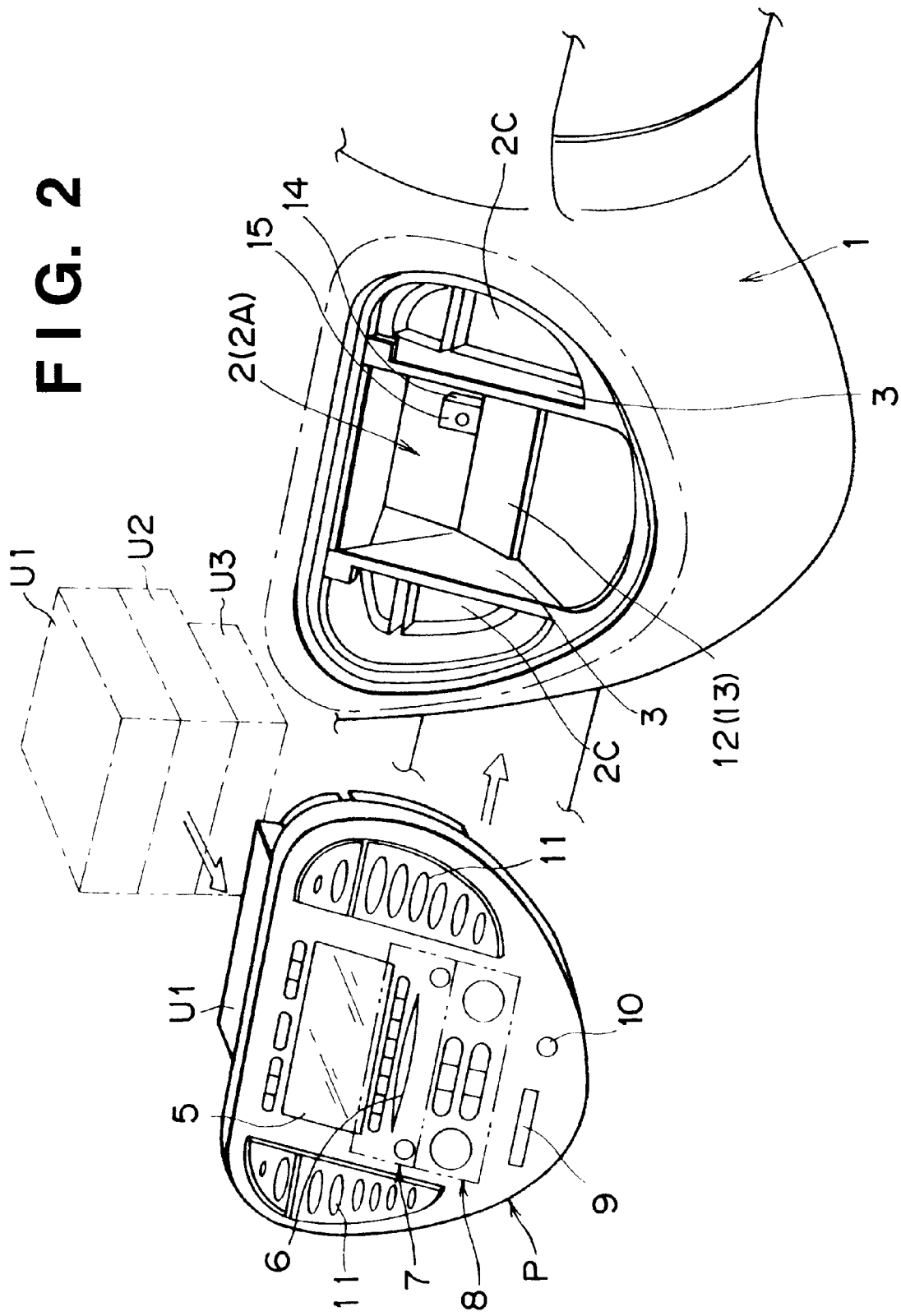
FIG. 2 is an exploded perspective view of principal part in FIG. 1.

[Description of FIGS. 1 and 2]

The outline of the overall embodiment of the present invention will be explained below with reference to FIGS. 1 and 2.

In FIGS. 1 and 2, reference numeral 1 denotes an instrument panel (dashboard) serving as a panel member which defines the wall surface in the passenger room. The instrument panel 1 has an opening portion 2 formed at nearly the middle portion in the widthwise direction of the vehicle. The opening portion 2 is formed to be large enough to receive stacked vehicle electric device components (to be described later). The opening portion 2 is covered by a central control panel P so that its interior is concealed from the passenger room. The central control panel P essentially constitutes a portion of the instrument panel 1.

Three electric device components U1, U2, and U3 are disposed on the rear surface side of the central control panel P (on the side opposite to the passenger room), so as to be located within the opening portion 2 (within the instrument panel 1). The central control panel P and the vehicle electric device components U1, U2, and U3 are coupled to and integrated with each other, and are electrically connected to each other so that they can exchange various control signals, status signals, and the like. A signal control component U1 serving as a second control unit performs input/output control of various signals between the central control panel and vehicle electric device components, as will be described later. Accessory control components U2 and U3 serving as first control units are respectively ones for an AM/FM radio receiver and CD player. Note that a vehicle electric device component for an air conditioner is placed at a position separated from the central control panel P, and is an external equipment which is not coupled to the central control panel P. The vehicle electric device components U1 to U3 each have a size substantially equal to or smaller than a 1-DIN size, are formed into a vertically low-profile box shape, and are vertically stacked.

The vehicle electric device components U1 to U3 have neither consoles (input units) operated by the passenger nor display units (output units) for displaying the activation states and the like (the same applies to other electric device components to be described later), and the display unit and console for these accessory electric device components U1 to U3 are arranged on the central control panel P. More specifically, the central control panel P has a display 5 as a visual display unit comprising a liquid crystal display, an opening 6 which is formed below the display 5 and is used for loading/unloading a compact disk into/from the accessory electric device component U3, an audio operation switch group 7 disposed around the opening 6, and an air-conditioning switch group 8 disposed below the opening 6 and switch group 7. These opening and switch groups serve as a console.

The display 5 is commonly used by the accessory control components U2 and U3, and the vehicle electric device component for the air conditioner. The switch group 7 is commonly used by the accessory control components U2 and U3. The switch group 8 is exclusively used for air-conditioning operations. In this manner, the passenger operates the accessory control components U2 and U3 using the switch group 7 as a console arranged on the central control panel P, and the activation conditions of the accessory control components U2 and U3 corresponding to the operation conditions of the switch group 7 are displayed on the display 5 as well as the operation states (operation selection states) of the switch groups 7 and 8. Note that the types of switches included in the switch groups 7 and 8 and the display contents on the display 5 are the same as those of a conventional CD player, AM/FM radio receiver, and air conditioner.

The central control panel P also has an ashtray 9 and cigarette lighter 10, which are juxtaposed in the widthwise direction of the vehicle below the air-conditioner switch group 8. Furthermore, air outlets 11 for the air-conditioner are formed on the right and left end portions of the central control panel P.

The opening portion 2 is horizontally divided into three opening portions 2A and 2C by a pair of right and left vertically extending partition walls 3. The largest opening portion 2A stores the vehicle electric device components U1 to U3. The opening portions 2C formed on the right and left sides of the opening portion 2A serve as paths for air-conditioning air adjusted by the air-conditioning air outlets 11 of the central control panel P, and are connected to an air-conditioning air duct (not shown).

The central control panel P and vehicle electric device components U1 to U3 form an integrated subassembly KP in advance before they are mounted on the vehicle, and the subassembly is mounted on the vehicle via the opening portion 2 from the side of the vehicle electric device components U1 to U3, so that the vehicle electric device components U1 to U3 are stored in the opening portion 2A.

Upon completion of assembly, the central control panel P essentially constitutes a portion of the instrument panel 1. Note that the outer edge portion of the central control panel P is substantially flush with the opening edge portion of the opening portion 2, i.e., the instrument panel 1 upon completion of assembly to the instrument panel 1.

Figure 3:
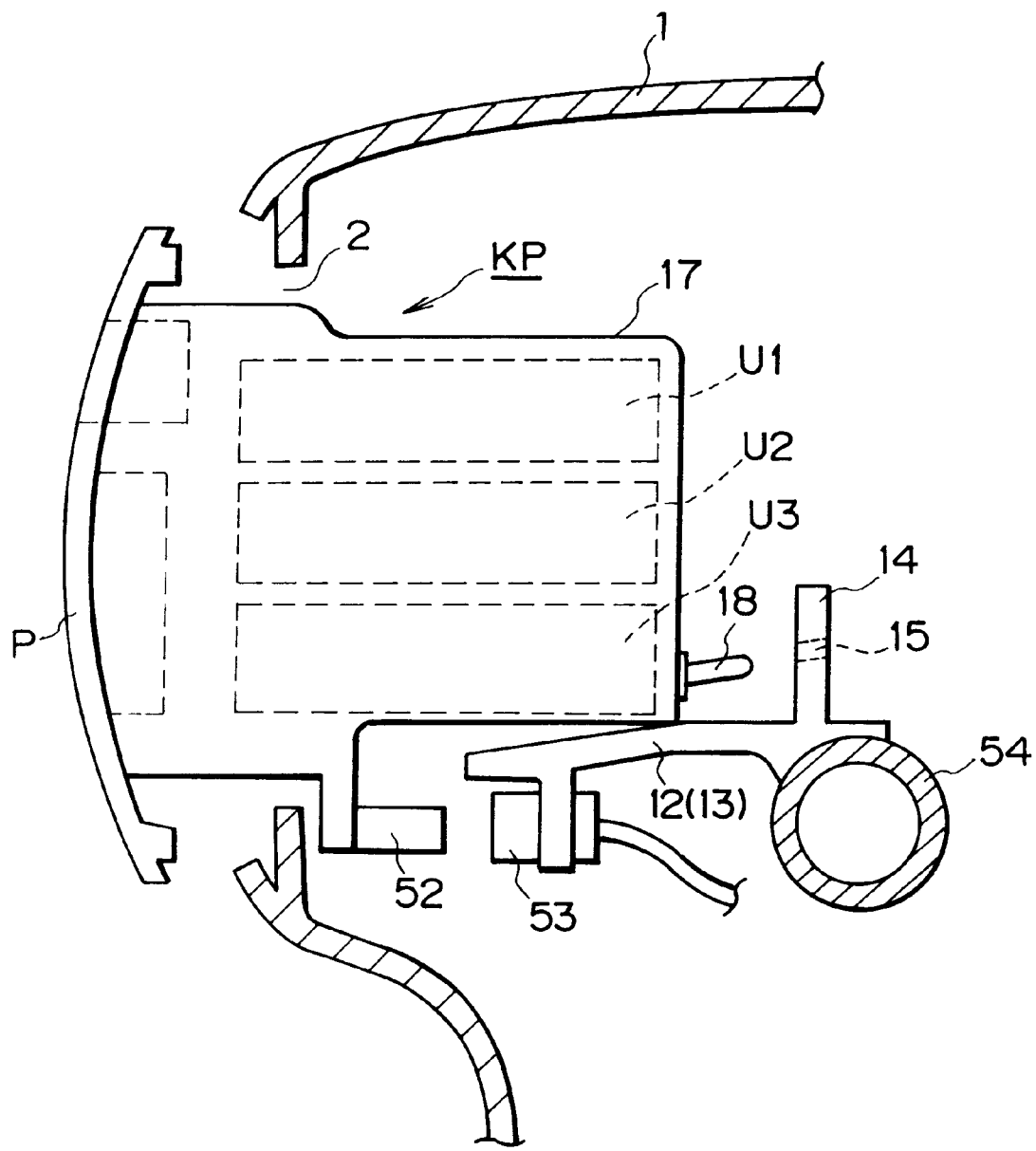
FIG. 3 is a side sectional view showing the state wherein a subassembly of a central control panel and vehicle electric device components is assembled to the instrument panel.
Figure 4:
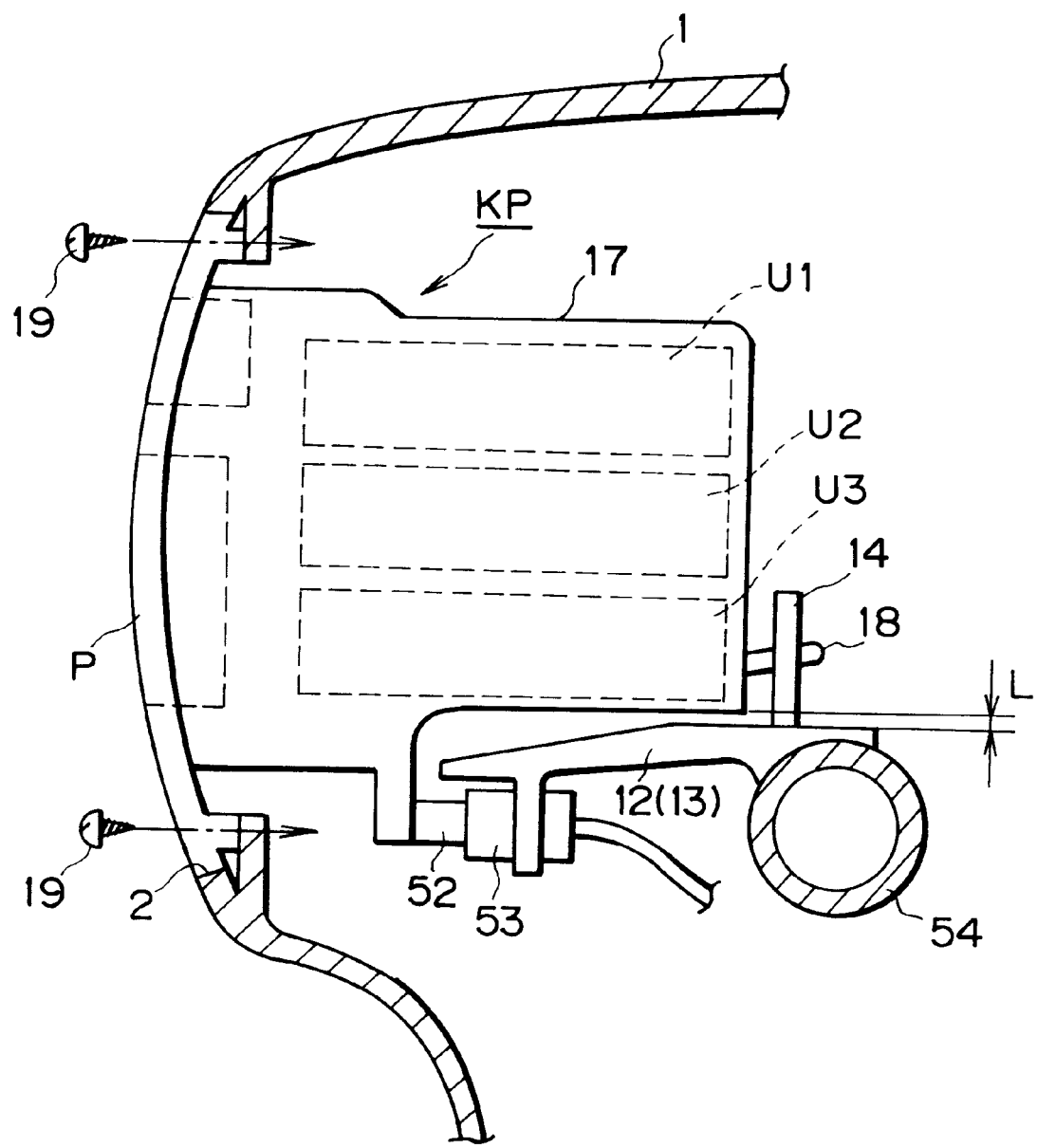
FIG. 4 is a side sectional view showing the state wherein the subassembly of the central control panel and vehicle electric device components has been assembled to the instrument panel.

As shown in FIGS. 3 and 4, a steering support member 54 extends in the horizontal direction, i.e., the widthwise direction of the vehicle inside the instrument panel 1. As is well known, the steering support member 54 serves as a reinforcement member of the vehicle body side, and a stay 12 obtained by working a metal plate such as an iron plate or the like is fixed to the steering support member 54 by, e.g., welding or the like. The stay 12 has a guide member 13 and support member 14. The guide member 14 has a flat shape as a whole, and extends backward from the steering support member 54, i.e., toward the opening portion 2. At least the upper surface of the guide member 13 extends approximately horizontally near the steering support member 54, and gradually lowers toward the opening portion 2 (when viewed from the opening portion 2 side, the upper surface of the guide member 13 gradually becomes higher toward the steering support member 54, i.e., forward, and roughly horizontally extends near the steering support member 54).

The support member 14 is formed as if the stay 12 partially extended upright near the steering support member 54. The support member 14 is formed with a fitting hole (fitting recess portion) 15 at a predetermined level position. The fitting hole 15 is slightly tilted to gradually rise toward the front.

The plurality of vehicle electric device components U1 to U3 that forms the subassembly KP are housed in a case body 17, which firmly couples the plurality of vehicle electric device components U1 to U3 (especially vertically), and is fixed to the rear surface of the central control panel P to integrally reinforce the subassembly KP. A fitting projection 18 integrally extends forward from the front surface of the case body 17, i.e., the surface near the steering support member 54. The fitting projection 18 fits into the fitting hole 15, and is slightly tilted to gradually rise toward the front.

A first connector 52 serving as a connector on the side of the subassembly KP is arranged on the lower surface of the case body 17. A second connector 53 as a connector on the vehicle body side is arranged on the bottom surface of the stay 12 in correspondence with the first connector 52. The connection portion of the first connector 52 faces forward, and that of the second connector 53 faces backward. The connectors 52 and 53 are of aligning type, as is well known, and can be connected to each other by fitting even when their positions are slightly offset from each other. Note that these connectors 52 and 53 are used for connecting an external equipment (equipments on the vehicle body side) outside the subassembly KP, for example, connecting the vehicle electric device component for the air conditioner, loudspeaker, antenna, power supply, or the like.

The processes for assembling the subassembly KP into the instrument panel 1 will be described below.

The subassembly KP, which is integrated in advance as well as the case body 17, is inserted into the instrument panel 1 via the opening portion 2 from the side of the vehicle electric device components U1 to U3. At the beginning of insertion, the bottom surface of the front end portion of the subassembly KP is placed on the guide member 13, and after that, the subassembly KP is inserted while its weight is supported by the guide member 13.

When the nearly horizontal portion of the guide member 13, i.e., its portion near the steering support member 54 supports the subassembly KP, the fitting projection 18 is located in the very proximity of the fitting hole 15, and the first connector 52 is also located in the very proximity of the connector 53 (see FIG. 3). When the subassembly KP is inserted deeper from the state shown in FIG. 3, the fitting projection 18 is inserted into the fitting hole 15, and at that time, the first connector 52 is connected to the second connector 53.

When the subassembly KP is further inserted, the fitting projection 18 fits into the fitting hole 15 deeper. In this case, due to the tilt of the fitting projection 18 and fitting hole 15, the subassembly KP slightly floats from the guide member 13 and is spaced therefrom (symbol L in FIG. 4 indicates the separation distance). At the same time, the first connector 52 completely fits into the second connector 53, and they are electrically connected to each other. After that, the central control panel P is fixed to the instrument panel 1 (to the peripheral edge portion of its opening portion 2) by set members 19 such as screws or the like, thus completing assembly to the instrument panel 1.

Upon insertion of the subassembly KP into the opening portion 2, the subassembly KP is prevented from largely horizontally deviating by the partition walls 3 of the instrument panel 1, and fitting between the fitting hole 15 and fitting projection 18, and connection between the connectors 52 and 53 can be more easily done. Since the fitting projection 18 has a tapered distal end portion, it can reliably fit into the fitting hole 15 while absorbing any small positional deviation from the fitting hole 15. The subassembly KP can be detached from the instrument panel 1 in a procedure opposite to that described above.

In the assembly completion state of the subassembly KP to the instrument panel 1, the front end portion side of the subassembly KP is securely supported by the steering support member 54 via the support member 14, and its rear end portion side is supported by the instrument panel 1 by the set members 19. Since the subassembly KP as a load member is separated from the guide member 13 which extends from the steering support member 54 in a cantilever style, the subassembly KP can be prevented from contacting the guide member 13 to produce vibrations while the vehicle is traveling.

Figure 5:
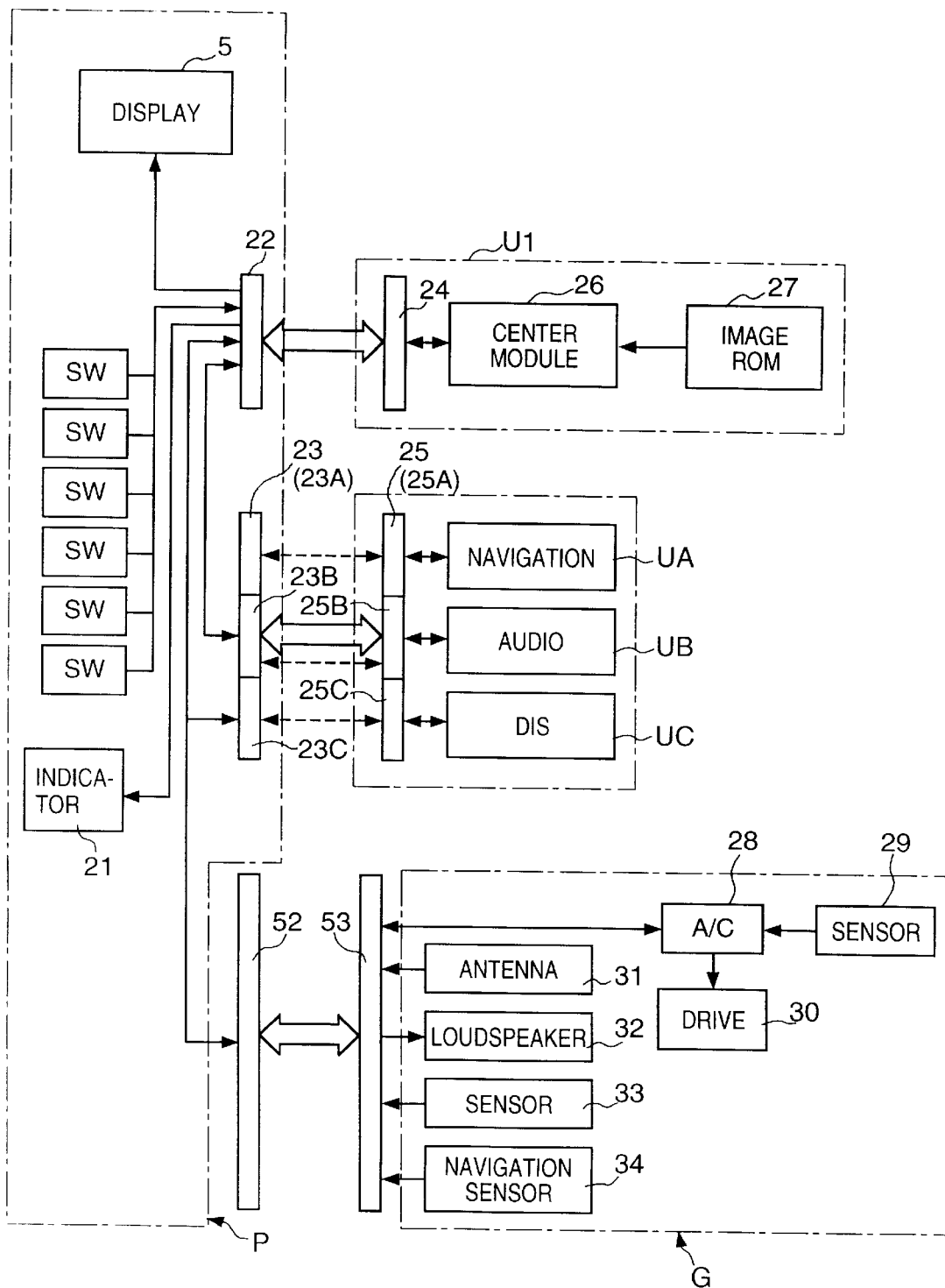
FIG. 5 is a block diagram showing a connection example between the central control panel and vehicle electric device components.

[Description of FIG. 5]

The relationship between the central control panel P and vehicle electric device components U1 to U3 will be explained below with reference to FIG. 5. FIG. 5 shows all the functions that can be added to the central control panel P as those for a high grade, and the components shown in FIGS. 1 and 2 are selectively added from those shown in FIG. 5.

Under such condition, the central control panel P has the display 5, a switch group SW corresponding to the switch groups 7 and 8, and an indicator (lamp) 21 serving as another display unit. The central control panel P has a connection portion (connector) 22 for the signal control component U1, and a connection portion (connector) 23 for accessory control components UA to UC.

Three vehicle electric device components UA, UB, and UC shown in FIG. 5 correspond to the accessory control components U2 and U3. The vehicle electric device component UA is one for a navigation apparatus, the vehicle electric device component UB is one for an audio system, and the vehicle electric device component UC is one for a DIS (drive information system which presents the traffic information, current mileage, current average vehicle velocity, and the like). Reference numeral 25 denotes a connection portion (connectors) for these accessory control components UA to UC to the central control panel P, which connection portion is detachably connected to the connection portion 23 of the central control panel P. Note that the connection portions 23 and 25 are substantially independent of each other in units of vehicle electric device components UA to UC, and three each connection portions 23A to 23C or 25A to 25C are arranged in practice (the connectors 23A and 25A are connected to each other, the connectors 23B and 25B are connected, and the connectors 23C and 25C are connected).

The signal control component U1 has a center module 26 including a CPU for performing principal control for signal communications, and an image ROM. Reference numeral 24 denotes a connection portion (connector) for the signal control component U1. This connection portion 24 is detachably connected to the connection portion 22 of the central control panel P.

Reference symbol G generally denotes external devices such as the air-conditioning control component, and the like, which are not shown in FIGS. 3 and 4. Of the external devices G, reference numeral 28 denotes an air-conditioning controller; 29, sensors required for air-conditioning control; and 30, an air-conditioning drive component, which is drive-controlled in accordance with instructions from the controller 28. Also, reference numeral 31 denotes an antenna; 32, loudspeaker; 33, various sensors used for the accessory control component UC for the DIS; and 34, various sensors required for the accessory control component for the navigation apparatus. The external devices (31 to 34) exclusive for the accessory control components UA to UC can communicate signals with these accessory control components UA to UC without the intervention of the signal control component U1.

All the signal communications between the central control panel P and accessory control components UA to UC are made while intervening the signal control component U1 via communication lines provided to the central control panel P, except that only an image signal from the accessory control component UA for the navigation apparatus is directly output to the display 5. More specifically, operation signals from the switch group SW of the central control panel P are independently input to the signal control component U1 via the communication lines provided to the central control panel P, and activation command signals corresponding to the operation states of the switch group SW are output from the signal control component U1 to the accessory control components UA to UC or external devices G (the air-conditioning controller 28 thereof) via the communication lines provided to the central control panel P and the connectors 22, 23, or 52 provided to the central control panel P.

After activation signals indicating the activation conditions of the accessory control components UA to UC (and air-conditioning controller 28) are temporarily input to the signal control component U1, output signals according to the activation signals are output from the signal control component U1 to the display 5 or indicator 21 as the display units. In this way, since the central control panel P has the communication lines but no signal communication function with the accessory control components UA to UC, it can be constituted with lower cost than when the function of the signal control component U1 that controls signal communications is provided to the central control panel P.

Note that the central control panel P or vehicle electric device components U1 and UA to UC comprise I/O ports, A/D ports, SI/SO ports, and interfaces in accordance with the types of signals, but they are not shown. Also, electric power is supplied from the connector 52 to the vehicle electric device components U1 and UA to UC via the central control panel P.

Figure 6:
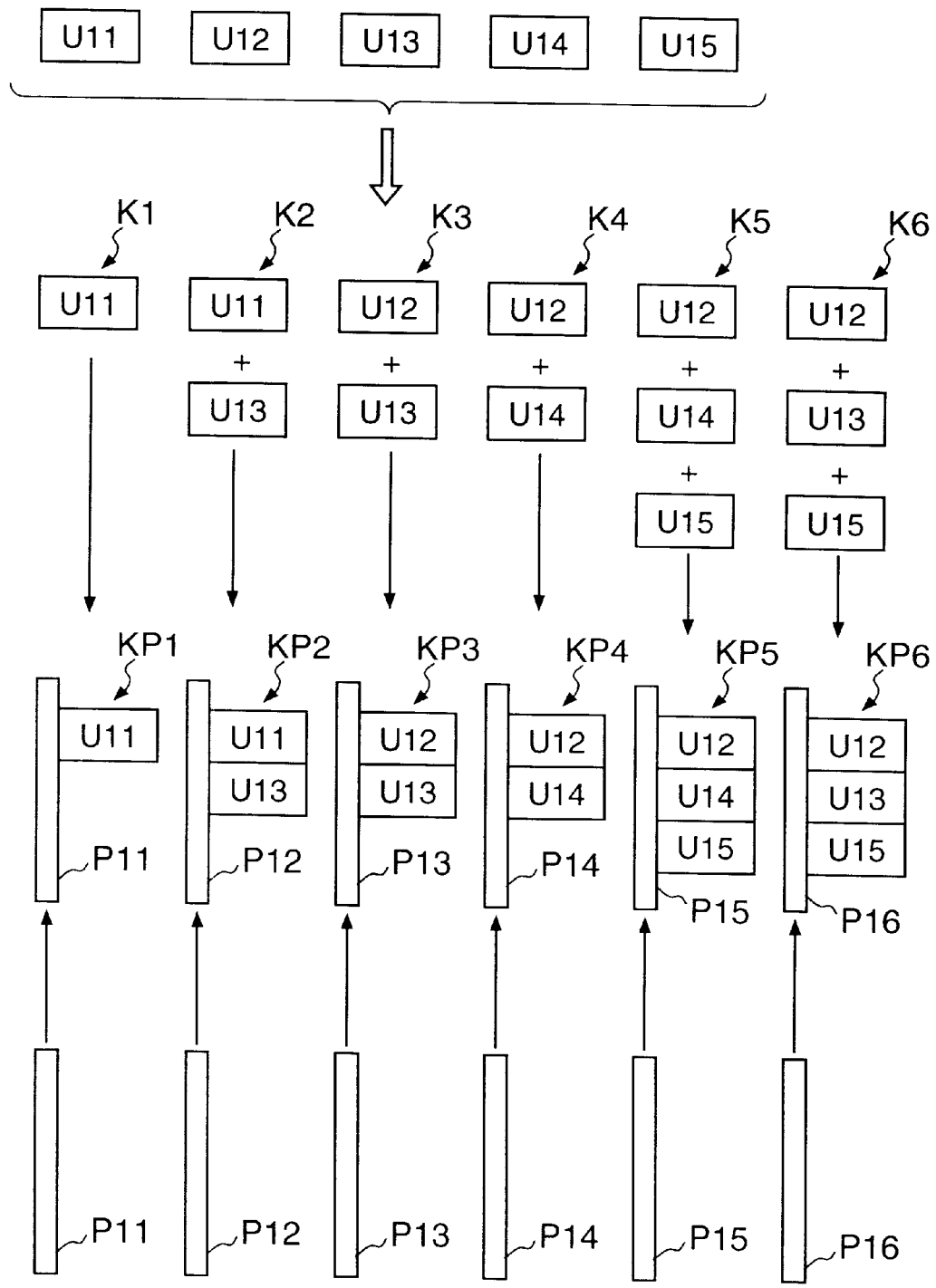
FIG. 6 is a chart for explaining the process of obtaining required subassemblies from a plurality of vehicle electric device components and a plurality of central control panels.

[Description of FIG. 6]

FIG. 6 schematically shows the processes upon obtaining subassemblies of the vehicle electric device components and central control panel corresponding to the differences of vehicle types including the grades of vehicles from a plurality of electric device components and a plurality of central control panels, which are prepared in advance. In FIG. 6, five different accessory control components U11 to U15 are prepared. A total of six different combinations K1 to K6 of components can be selected from these five different accessory control components U11 to U15. A total of six different central control panels are prepared in correspondence with these six different combinations K1 to K6. Note that the signal control component U1 is commonly used by all the combinations, and an identical one is used for an arbitrary central control panel (an arbitrary combination of accessory control components U11 to U15). Hence, the component U1 is not shown in FIG. 6.

One of the combinations K1 to K6 of vehicle electric device components is selected according to the type of vehicle. Similarly, one of the central control panels P11 to P16 is selected according to the type of vehicle. When the selected one of the combinations K1 to K5 is coupled and connected to the selected one of the central control panels P11 to P16, one of subassemblies KP1 to KP6 is obtained, and is mounted on the vehicle.

The assemblies KP1 to KP6 can be prepared in advance. Based on the type of vehicle, the combination of vehicle electric device components (one selected from K1 to K6) and the central control panel (one selected from P11 to P16) are selected according to the type of vehicle, and the selected combination of vehicle electric device components is coupled and connected to the selected central control panel to obtain one of the subassemblies KP11 to KP16.

Based on the combinations K1 to K6, the required central control panel is selected (one of P11 to P16 is selected) in accordance with one of these combinations, and the subassembly (KP11 to KP16) is obtained in correspondence with the combination of vehicle electric device components. Based on the central control panels P11 to P16, the combination of vehicle electric device components corresponding to the central control panel used is selected (one of K1 to K5 is selected), thus obtaining one of the subassemblies KP11 to KP16 corresponding to the central control panel.

The number of combinations corresponding to the number (variety) of units may be equal to, smaller than, or larger than the number of accessory control units. The central control panels normally prepared in correspondence with the number (variety) of combinations. However, for example, when a high-grade central control panel is commonly used for some lower grades, the number of central control panels may be smaller than that of combinations (an unnecessary opening may be covered by a blank cover, or some switches are disabled). Of course, the numbers (variety) of vehicle electric device components, combinations, and central control panels are not limited to those shown in FIG. 6, but may be appropriately determined. As the numbers of units and combinations increase, the advantages of the present invention are enhanced.

INDUSTRIAL APPLICABILITY

The embodiment has been described, but the present invention is not limited to this embodiment and includes, e.g., the following cases. The vehicle electric device components to be coupled and connected to the central control panel P are not limited to the illustrated ones. In addition, a vehicle control unit, engine control unit, automatic transmission control unit, ABS control unit, auto-cruising control unit, steering control unit, antitheft control unit, vehicle height adjustment control unit, driver identification control unit (e.g., identification using an ID card), ON/OFF-control unit for lamps of a vehicle, and the like may be appropriately used. In this case, in some accessory control components, at least one of its output and input units may be arranged on the central control panel P, and the other may be disposed at a position separated from the central control panel P (it is not coupled to the central control panel P). Especially, a vehicle electric device component with a small number of input members such as switches to be operated by the passenger is preferably not coupled to the central control panel P.

The fitting portion 18 forms a portion to be supported, and the support member 14 and fitting hole 15 form a supporting portion. Alternatively, the fitting projection 18 may be formed on the vehicle body side, and the fitting hole 15 may be formed on the subassembly KP side. The fitting projection 18 provided on the subassembly KP side may be formed independently of, e.g., the vehicle electric device component, and may be fixed by a fixing member or the like.

The central control panel P and vehicle electric device components may be separately mounted on the vehicle without being structurally coupled to each other. The central control panel P need not always be disposed on the instrument panel 1. For example, the panel P may be disposed on an appropriate inner wall such as a side panel or the like in the passenger room. A plurality of different accessory control components U1 may be prepared and changed (selected) in correspondence with the subassembly (a combination of accessory control components or central control panel.

The objectives of the present invention include not only the illustrated members but also tacitly include members described practically preferable or advantages.

As described above, according to this embodiment, since the display unit and console for the accessory control components are arranged on the central control panel formed independently of the vehicle electric device components, the degree of freedom in layout of the console and display can be remarkably improved, and is preferable in terms of improvement of operability and visibility.

Since the central control panel is arranged independently of the vehicle electric device components, the central control panel, especially, its surface facing the passenger room, is designed to be suitable for the wall surface in the vehicle body, thus improving its appearance.

Furthermore, accessory control components with different functions can be directly used by exchanging the central control panel alone. That is, when the central control panel is exchanged in correspondence with specific combinations of the numbers and types of accessory control components, the same effect as that obtained by a set of a plurality of accessory control components having different functions can be obtained.

This allows easy selection of the number of combinations of a plurality of accessory control components with different functions, and leads to low cost.

Moreover, the layout position of each accessory control component is not so strictly limited since its operability and visibility need not be taken into consideration unlike the components which have their own displays and consoles, and the space inside the wall surface in the passenger room can be effectively used.

In addition, since the signal control component that executes signal communications is independently arranged to control signal communications with the accessory control components, and the central control panel need not have any functions of the signal control components, the cost of the central control panel can be reduced.

Since the connection positions of the accessory control components and signal control component with respect to the central control panel are predetermined, a failure diagnosis function or the like of determining connection states need not be additionally provided to the central control panel or control components, thus providing advantages in terms of cost.

Since the central control panel and respective control components are integrated in advance, they can form one set before they are mounted on the vehicle, and assembly errors with respect to the vehicle can be reduced.

Since a single signal control component can cope with a plurality of accessory control components, such arrangement is preferable in terms of space savings and the like.

Since image information of the navigation apparatus that requires a very large information transmission volume is directly output to the accessory control component, the need for signal communications of the signal control component therefor can be obviated, thus reducing the load on the signal control component and increasing the communication speed to the display unit. In addition, such arrangement is preferable for obtaining a low-cost signal control component. Since the signal control component need not process image information of the navigation apparatus, a signal communication function of many types of accessory control components can be provided to the signal control component, and the signal control component can be used perfectly commonly, independently of different types of vehicles, or commonly among a maximum possible number of types of vehicles.

When the accessory control components, signal control component, and central control panel are applied to the instrument panel on which many operation members such as switches and the like, and a display unit such as a display or the like are normally concentrated, the above-mentioned effects can be sufficiently provided.

Also, an assembling method of vehicle electric device components, which obtains the above-mentioned effects in accordance with the types of vehicles, can be provided. In particular, expensive accessory control components can be commonly used independently of the types of vehicles.

An assembly that forms a set can be assembled by a simple method, i.e., by inserting it from the passenger room side into the opening portion of the instrument panel.

What is claimed is:

1. A vehicle electronic equipment apparatus characterized by comprising:

a first control unit which is independently arranged, and executes different control processing operations;

a central control panel which has a console and display unit for said first control unit, and defines a portion of an inner surface of a passenger room; and a second control unit which is arranged independently of said first control unit and said central control panel, is electrically connected to said central control panel, and executes signal processing with said first control unit via said central control panel, and in that in a state wherein said first and second control units are electrically connected to said central control panel, an operation signal according to an operation of the console can be output from said central control panel to said second control unit, a control signal according to an operation of the console can be output from said second control unit to said first control unit via said central control panel, an activation signal representing an activation condition according to the control signal can be output from said first control unit to said second control unit via said central control panel, and said second control unit can output a display control signal according to the activation signal to said central control panel.

2. A vehicle electronic equipment apparatus according to claim 1, characterized in that said central control panel has a first connection portion to which said first control unit is electrically connected, and a second connection portion to which said second control unit is electrically connected.

3. A vehicle electronic equipment apparatus according to claim 2, characterized in that the inner surface of the passenger room comprises an instrument panel, which is formed with an opening portion for receiving said first and second control units, and the opening portion is covered by said central control panel while said first and second control units are stored in said instrument panel from the opening portion.

4. A vehicle electronic equipment apparatus according to claim 1, characterized in that said first and second control units are connected to said central control panel in a sub-assembly state, and said first and second control units and said central control panel are integrated.

5. A vehicle electronic equipment apparatus according to claim 4, characterized in that a plurality of said first control units and said second control unit are mounted, and said second control unit executes a signal communication with said at least one of said plurality of first control unit via a communication line provided to said central control panel.

6. A vehicle electronic equipment apparatus according to claim 4, characterized in that the inner surface of the passenger room comprises an instrument panel, which is formed with an opening portion for receiving said first and second control units, and the opening portion is covered by said central control panel while said first and second control units are stored in said instrument panel from the opening portion.

7. A vehicle electronic equipment apparatus according to claim 1, characterized in that a plurality of said first control units and said second control unit are mounted, and said second control unit executes a signal communication with at least one of said plurality of said first control unit via a communication line provided to said central control panel.

8. A vehicle electronic equipment apparatus according to claim 7, characterized in that the display unit is a display for displaying image information, wherein said at least one of said plurality of said first control unit includes a control unit for a navigation apparatus, and image information of said at least one of said plurality of said first control unit for th e navigation apparatus is output to said central control panel without intervention of said second control unit.

9. A vehicle electronic equipment apparatus according to claim 8, characterized in that the inner surface of the passenger room comprises an instrument panel, which is formed with an opening portion for receiving said at least one of said plurality of said first and second control units, and the opening portion is covered by said central control panel while said at least one of said plurality of said first and second control units are stored in said instrument panel from the opening portion.

10. A vehicle electronic equipment apparatus according to claim 7, characterized in that the inner surface of the passenger room comprises an instrument panel, which is formed with an opening portion for receiving said at least one of said plurality of said first and second control units, and the opening portion is covered by said central control panel while said at least one of said plurality of said first and second control units are stored in said instrument panel from the opening portion.

11. A vehicle electronic equipment apparatus according to claim 1, characterized in that the inner surface of the passenger room comprises an instrument panel, which is formed with an opening portion for receiving said first and second control units, and the opening portion is covered by said central control panel while said first and second control units are stored in said instrument panel from the opening portion.

12. An assembling method for a vehicle electronic equipment apparatus, comprising:

a first step of selecting at least one of a plurality of first control units, which are independent from each other, and execute different control processing operations, in correspondence with a type of vehicle;

a second step of selecting one of central control panels, each of which has a console and display unit for said at least one of a plurality of first control unit, and defines a portion of an inner surface of a passenger room, in correspondence with the type of vehicle; and a third step of electrically connecting a second control unit, which is arranged independently of said at least one of a plurality of first control unit and said central control panel, and executes signal processing with said first control unit via said at least one of a plurality of central control panel, and said at least one of a plurality of first control unit selected in the second step to said at least one of a plurality of central control panel selected in the first step, and in that said at least one of a plurality of first and second control units are electrically connected to said central control panel, so as to allow said central control panel to output an operation signal according to an operation at the console to said second control unit, said second control unit to output a control signal according to an operation at the console to said at least one of a plurality of first control unit via said central control panel, at least one of a plurality of said first control unit to output an activation signal representing an activation condition corresponding to the control signal to said second control unit via said central control panel, and said second control unit to output a display control signal according to the activation signal to said central control panel.

13. An assembling method for a vehicle electronic equipment apparatus according to claim 12, further comprising:

a fourth step of integrating said at least one of a plurality of first and second control units, and said central control panel by connecting said first and second control units to a rear surface of said at least one of a plurality of central control panel in a subassembly state, and in that said first arid second control units, and said at least one of a plurality of central control panel are assembled in a vehicle in the integrated state obtained in the fourth step.

14. An assembling method for a vehicle electronic equipment apparatus according to claim 12, characterized in that the inner surface of the passenger room comprises an instrument panel, which is formed with an opening portion for receiving said at least one of a plurality of first and second control units, and the opening portion is covered by said central control panel while said first and second control units are stored in said at least one of a plurality of instrument panel from the opening portion.

* * * * *

UNITED STATES PATENT AND TRADEMARK OFFICE
CERTIFICATE OF CORRECTION

PATENT NO. : 6,093,977
DATED : July 25, 2000
INVENTOR(S) : Nagahisa Fujita et al.

It is certified that error appears in the above-identified patent and that said Letters Patent is hereby corrected as shown below:

<u>Title page,</u>
Item (56), References Cited, U.S. PATENT DOCUMENTS,
add -- 4,513,405  4/1985 Hills --.

<u>Column 12,</u>
Line 54, change "th e" to -- the --.

<u>Column 14,</u>
Line 25, change "arid" to -- and --.

Signed and Sealed this

Twenty-fifth Day of March, 2003

JAMES E. ROGAN
*Director of the United States Patent and Trademark Office*